United States Patent
Zapushek et al.

(10) Patent No.: US 6,393,874 B1
(45) Date of Patent: May 28, 2002

(54) LOCK CONSTRUCTION

(75) Inventors: John B. Zapushek, Racine, WI (US); Jerry R. Smith, Littleton, CO (US)

(73) Assignee: Master Lock Company, Milwaukee, WI (US)

( * ) Notice: Subject to any disclaimer, the term of this patent is extended or adjusted under 35 U.S.C. 154(b) by 0 days.

(21) Appl. No.: 09/511,230

(22) Filed: Feb. 23, 2000

(51) Int. Cl.[7] .............................. B60D 1/60; B60R 25/00
(52) U.S. Cl. ............................. 70/14; 70/33; 70/258; 70/360; 70/DIG. 9; 280/507
(58) Field of Search ................... 70/14, 33, 58, 70/232, 258, 360, DIG. 9; 280/507

(56) References Cited

U.S. PATENT DOCUMENTS

| | | | |
|---|---|---|---|
| 3,226,133 A | 12/1965 | Geresy | 280/507 |
| 3,410,580 A | 11/1968 | Longenecker | 280/507 |
| 3,492,023 A | 1/1970 | Thompson | 280/507 |
| 3,526,110 A | 9/1970 | Foote | 70/258 |
| 3,605,457 A | 9/1971 | Foster | 70/14 |
| 3,780,546 A | 12/1973 | Longenecker | 70/58 |
| RE28,187 E | 10/1974 | Longenecker | 280/507 |
| 3,855,825 A * | 12/1974 | Pickard | 70/14 |
| 3,977,221 A | 8/1976 | Foote | 70/58 |
| 4,163,375 A | 8/1979 | Fujitaki | 70/134 |
| 4,291,557 A | 9/1981 | Bulle et al. | 70/58 |
| 4,774,823 A | 10/1988 | Callison | 70/232 |
| 4,925,205 A | 5/1990 | Villalon et al. | 280/507 |
| 5,312,128 A | 5/1994 | Blacklaw | 280/512 |
| 5,492,206 A * | 2/1996 | Shieh | 70/33 X |
| 5,515,947 A | 5/1996 | Shieh | 188/69 |
| 5,517,837 A * | 5/1996 | Wang | 70/33 X |
| 5,752,398 A | 5/1998 | Villalon, Jr. | 70/58 |
| 5,873,271 A | 2/1999 | Smith | 70/58 |
| 5,937,679 A | 8/1999 | Villalon, Jr. | 70/58 |
| 5,964,107 A * | 10/1999 | Chang | 70/33 |
| 5,987,939 A * | 11/1999 | Pitisettakarn | 70/33 |

FOREIGN PATENT DOCUMENTS

| | | | | |
|---|---|---|---|---|
| CA | 2166245 | | 6/1997 | |
| CH | 472564 | * | 6/1969 | 70/33 |
| DE | G 92 14 195.1 | | 3/1993 | |
| IT | 414681 | * | 8/1946 | 70/33 |
| IT | 455873 | * | 3/1950 | 70/33 |

* cited by examiner

*Primary Examiner*—Lloyd A. Gall
(74) *Attorney, Agent, or Firm*—Calfee, Halter & Griswold

(57) ABSTRACT

The present invention is directed to a lock construction for securing to a trailer socket and thereby preventing attachment of the trailer socket to a connecting member of an unauthorized towing vehicle. The lock construction comprising a base with a first upstanding member extending from the base and adapted to engage the trailer socket of the trailer. A second upstanding member is disposed on the base in spaced relation to the first upstanding member. A shaft like member is positioned in the housing and is slidable toward the first upstanding member from an unlocked position where the third member is spaced away from the first upstanding member to a locked position wherein the third member engages the trailer socket once it is attached to the first upstanding member. A locking mechanism is operative connected to the third member and to allow slidable movement of the third member. A ratchet member and a ratchet surface are also included to allow slidable movement of the third member to different locked locations.

13 Claims, 8 Drawing Sheets

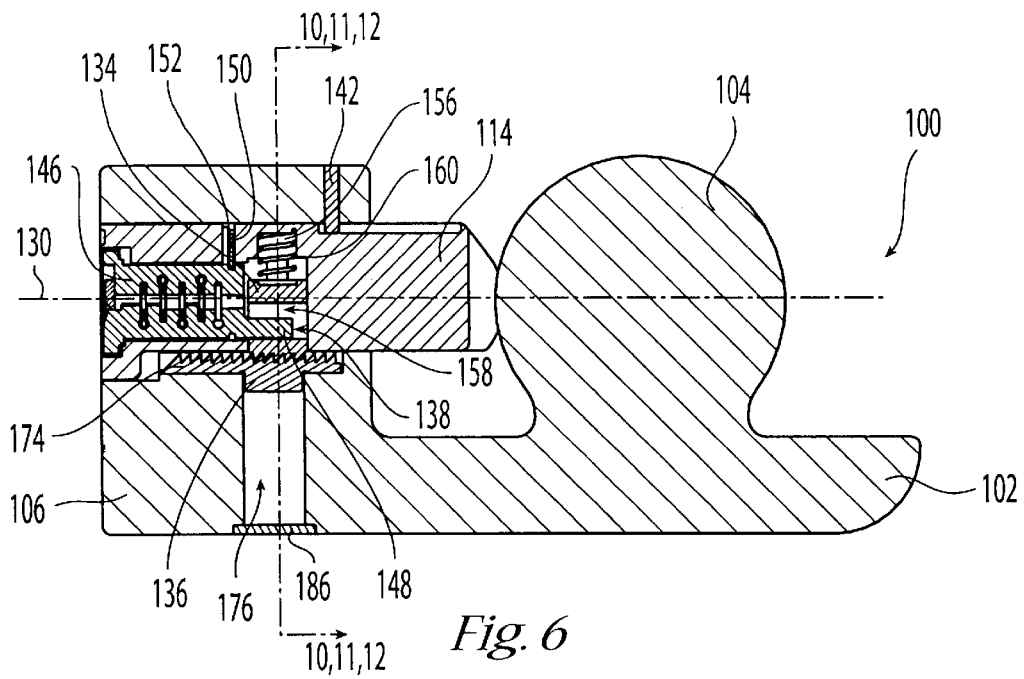
Fig. 6
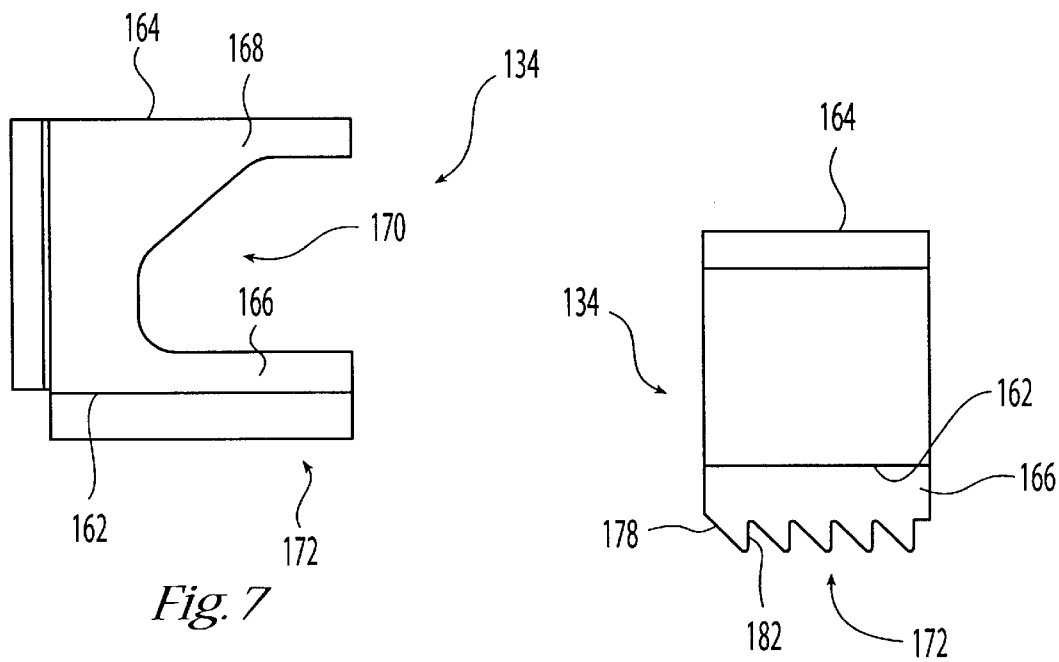
Fig. 7
Fig. 8
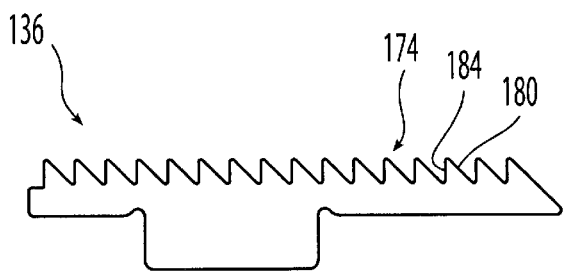
Fig. 9

LOCK CONSTRUCTION

BACKGROUND OF THE INVENTION

The present invention relates generally to a lock construction and particularly to a lock for securing trailers against unauthorized attachment to a trailer hitch of a towing vehicle. Conventionally, trailers are connected to a trailer hitch secured to a towing vehicle for towing the trailer behind the vehicle. The trailers are constructed with a trailer hitch socket that extends from the trailer and is attached to a connecting member, such as a ball, mounted on a towing bar secured to the towing vehicle. The connecting member is normally held in the trailer hitch socket by retractable devices that are operated by a clasp or a lever. Once the socket is fitted over the connecting member, the retractable devices engage the lower half of the member and the lever secures the retractable devices over the member. Once engaged, the retractable devices prevent the separation of the trailer from the towing vehicle until the retractable devices are released by the lever. When the trailer is not being towed, it is often disengaged from the vehicle, leaving the trailer highly susceptible to theft due to the ease of attaching the trailer socket to a trailer hitch of an unauthorized vehicle.

Several devices have been developed to prevent trailer theft by preventing connection of the trailer hitch socket to the trailer hitch of an unauthorized towing vehicle. U.S. Pat. No. 5,332,251 to Farquhar discloses a trailer hitch lock assembly comprising an upper bolt plate with a bolt that engages a lower shield plate. A separate padlock is used to engage a hole in the bolt to secure the bolt plate and the shield plate togther. The use of the separate padlock for securing the plates together makes the lock more difficult to operate due to the additional attachment of parts. Additionally the padlock is exposed, allowing access for tampering with the locking mechanism.

U.S. Pat. Nos. 4,032,171 to Allen et al. and U.S. Pat. No. 5,873,271 to Smith both disclose trailer hitch locks that are adaptable for use with a trailer having a ball shaped connecting member. The Allen trailer hitch lock discloses a separate padlock for securing the locking assembly. As in the lock disclosed in Farquhar, the Allen lock construction leaves the padlock open to tampering. Smith discloses a lock having upper and lower jaws such that the upper jaw is moveable vertically between the locked and unlocked positions. The vertical construction makes the lock difficult to operate wherein the upper jaw must be manually lifted and adjusted to accommodate different sizes of trailer sockets.

Accordingly, there is a need for a lock that is adaptable to different types and sizes of the socket on the trailer and provides greater ease in operation while maintaining a high level of security.

SUMMARY OF THE INVENTION

The present invention is directed to a lock construction for securing to a trailer socket and thereby preventing attachment of the trailer socket to a connecting member of an unauthorized towing vehicle. The lock construction comprises a base with a first upstanding member extending from the base and adapted to engage the trailer socket of the trailer. A second upstanding member is disposed on the base in spaced relation to the first upstanding member. A shaft like member is positioned in the housing and is slidable toward the upstanding member from an unlocked position where the shaft is spaced away from the upstanding member to a locked position wherein the shaft engages the trailer socket once it is attached to the upstanding member. A locking mechanism is operatively connected to the shaft for movemenet between a first position to release the shaft for slidable movement and a second position to prevent the shaft from slidable movement. The lock additionally includes a ratchet member and ratchet surface, allowing slidable movement of the shaft to different locked locations.

BRIEF DESCRIPTION OF THE DRAWINGS

"FIG. 6 is cross-sectional view taken along line 6—6 of the lock in FIG. 5."

FIG. 7 is a front view of a ratchet member for the lock in FIG. 1;

FIG. 8 is a side view of the ratchet member for the lock in FIG. 1;

FIG. 9 is a side view of the ratchet surface for the lock in FIG. 1;

DESCRIPTION OF THE PREFERRED EMBODIMENTS

Figure 1:
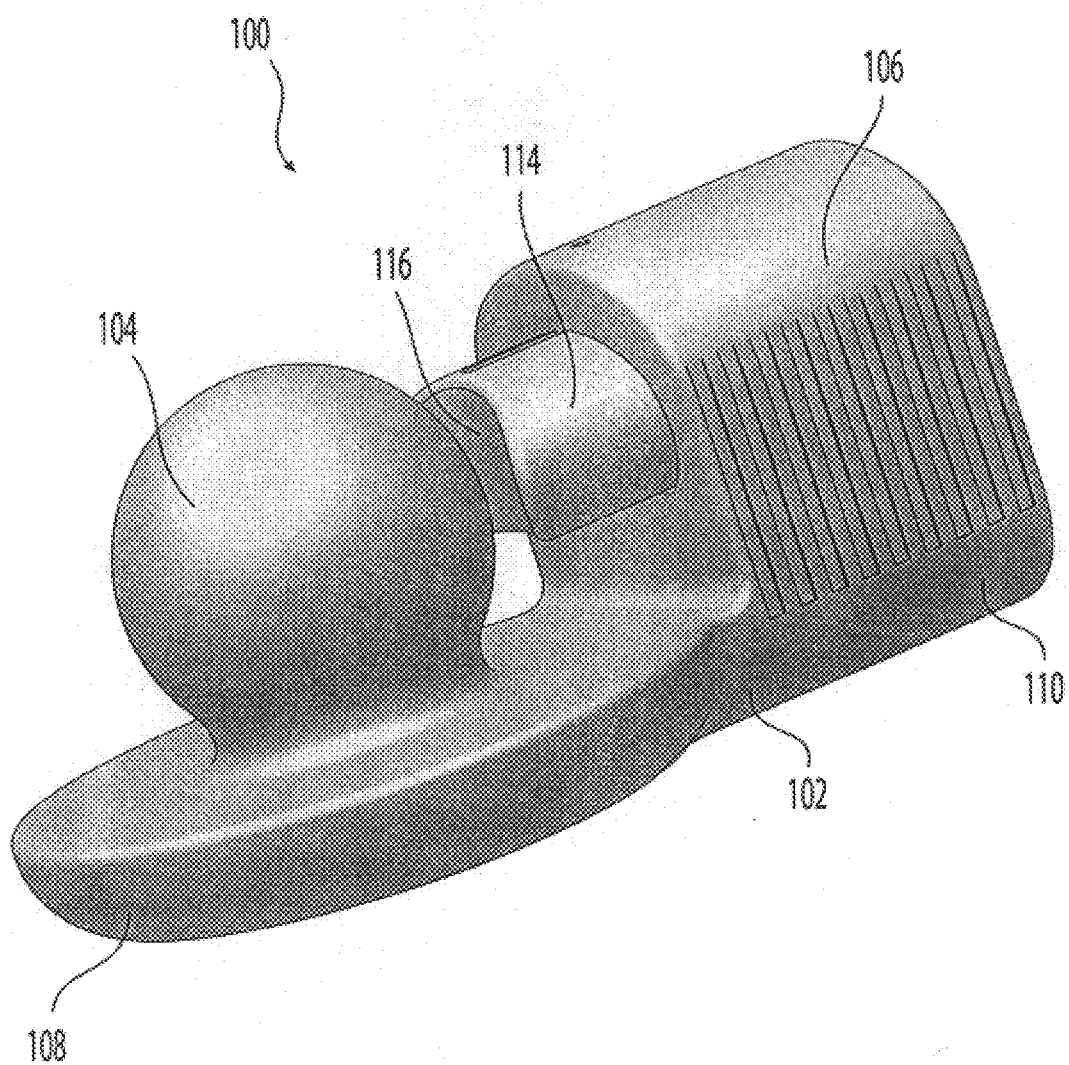
FIG. 1 is a perspective view of a lock construction according to the present invention.

Referring now to FIG. 1, the lock 100 of the present invention is shown having a base 102 with first and second upstanding members 104 and 106 disposed respectively on first and second portions 108 and 110 of the base 102. The base 102 may be constructed of any ferrous or non-ferrous material such as steel, aluminum, zinc or molded plastic. Additionally, an insert constructed of a rubber or other non-slipping materials may also be attached to the bottom side of the base to prevent slippage of the lock 100 during storage of the lock 100.

Figure 2:
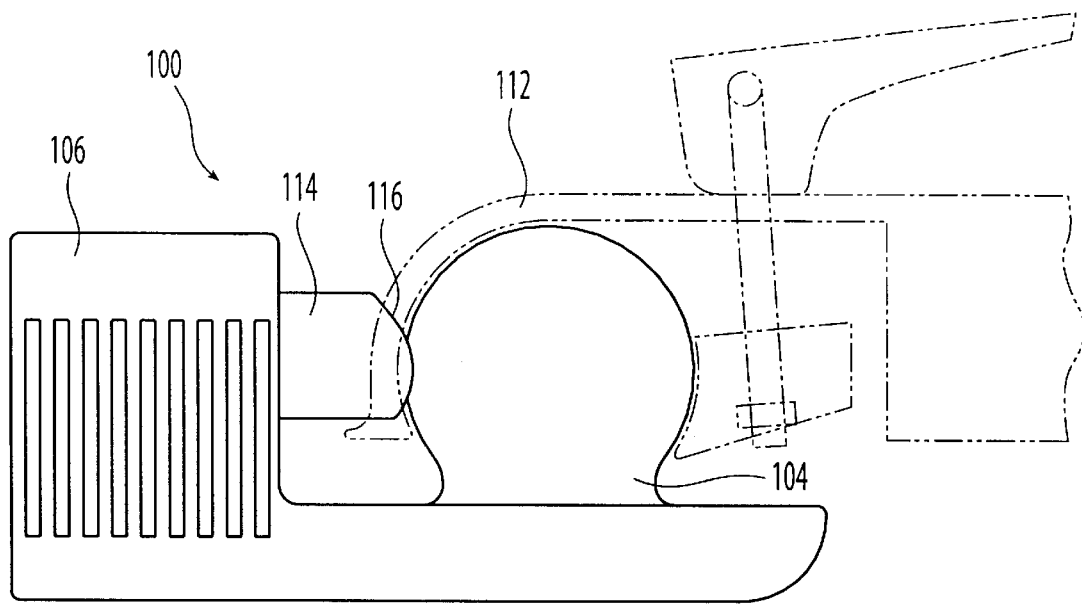
FIG. 2 is side view of the lock construction in FIG. 1, showing a shaft extending toward a first upstanding member to engage a trailer socket.

The first upstanding member 104 is shown as a spherical ball similar to the ball typically used in a trailer hitch for engaging a trailer socket 112 from the trailer, as shown in FIG. 2. The ball 104 of the present lock 100 substitutes for the connecting member of a trailer hitch that is normally welded to a tow bar of a towing vehicle. The lock 100 is secured to the trailer socket by inserting the ball 104 within the socket 112 and secured the lock thereto to prevent the attachment of the trailer socket 112 to the connecting member of an unauthorized towing vehicle. The ball 104 has an outer configuration that is shaped to match the inner configuration or cavity of the socket 112 to maximize the contact surface area between the ball 104 and the socket 1

12 and for a more secure attachment when the socket 112 is attached to the ball 104.

Figure 3:
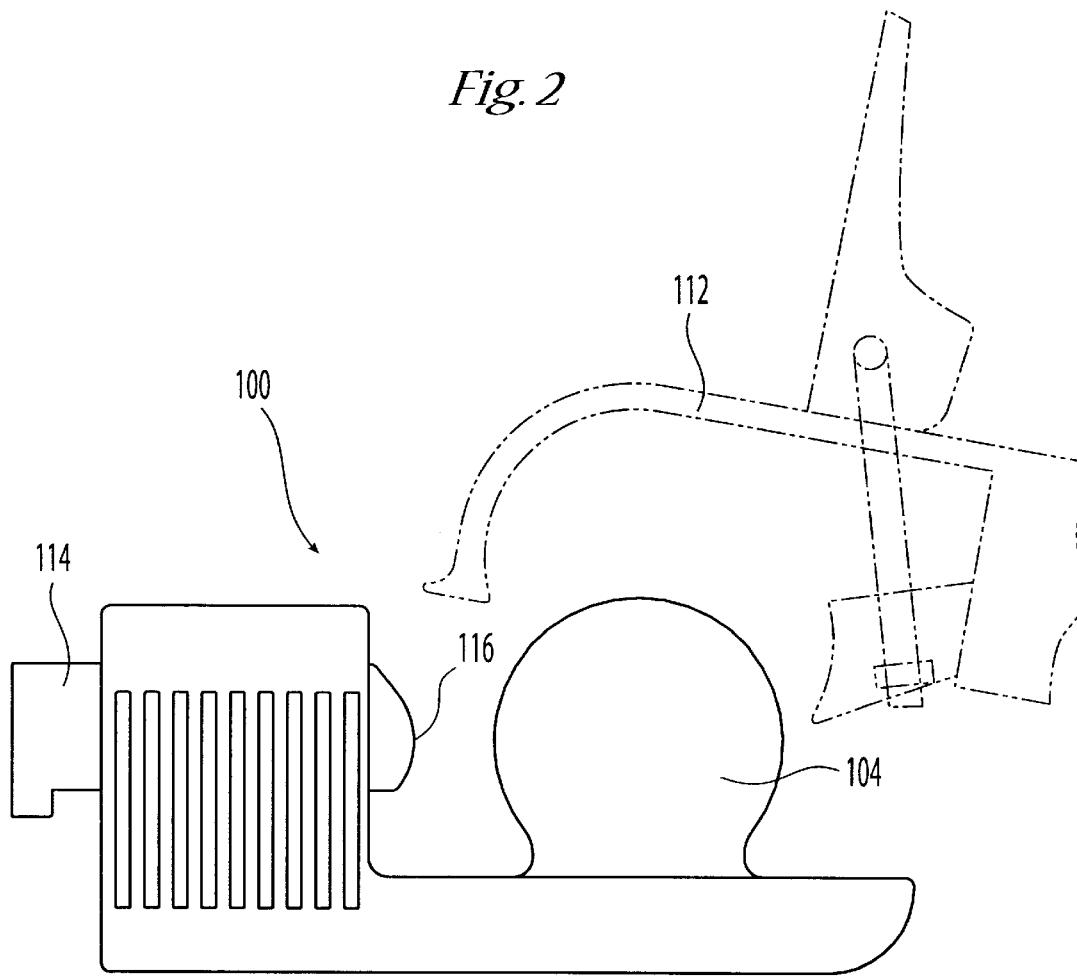
FIG. 3 is a side view of the lock construction in FIG. 1, showing the shaft away from the first upstanding member to release the trailer socket.

"The second upstanding member 106 is in the form of a lock housing and is disposed on the second portion 110 of the lock 100 for retaining the operating elements of the lock 100. A shaft like member 114 is slidable from the housing 106 toward the ball 104, as shown in FIG. 2, to a locked position for securing an object such as a trailer socket 112 between the shaft 114 and the ball 104. The shaft 114 is slidable away from the ball 104, as shown in FIG. 3, to an unlocked position for releasing the socket 112. Preferably, the tip 116 of the shaft 114 is shown as having a spherical recess matching the outer surface of the ball 104, as shown in FIG. 1. Similar to the outer configuration of the ball 104, the spherical recess of the shaft tip 116, with a shape to match the outer surface of the socket 112, further increases the surface area of contact with the socket 112 and thereby hence increases the security of the attachment of the trailer socket 112 between the shaft 114 and the ball 104."

Figure 4:
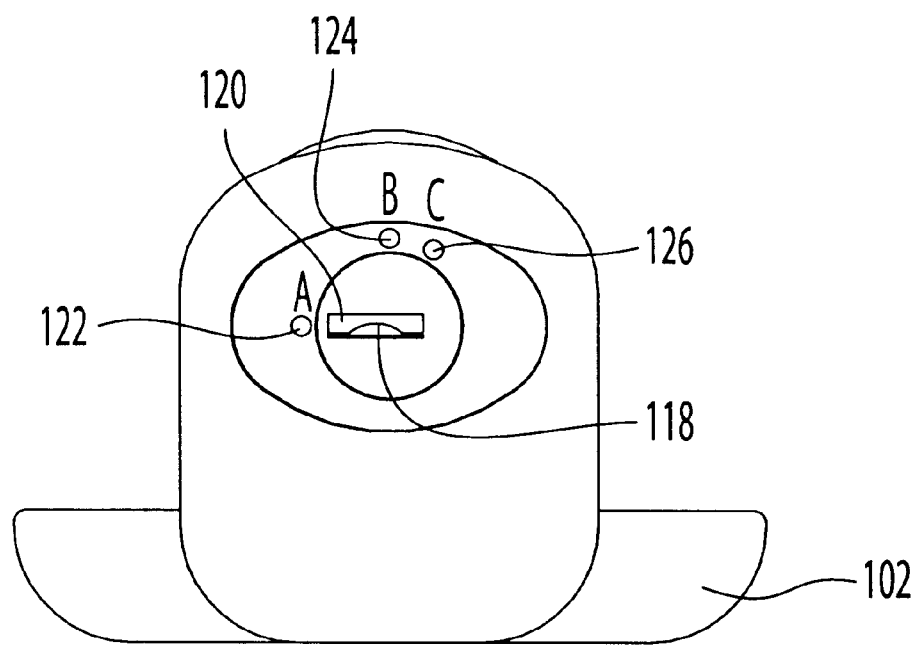
FIG. 4 is a front view of the lock construction in FIG. 1.

Referring now to FIG. 4, a keyway 118 is located on the front of the lock 100 for inserting an authorized key to operate the lock 100. A pivotable cover 120 is disposed over the keyway 118 to protect the lock housing 106 from dirt or other debris that may enter the lock housing 106. In the operation of the lock 100, the shaft 114 is movable with respect to the ball 104 when the lock 100 is in the unlocked position and is prevented from movement when the lock 100 is in the locked position. The unlocked position additionally includes two different operational positions, a releasing position where the shaft 114 is permitted to move toward and away from the ball 104, and a ratcheting position where the shaft 114 is only permitted to move toward the ball 114 to different lock locations. Accordingly, the lock 100 has three operational positions, locked, ratcheting and releasing. These operational positions are accomplished by the insertion of the authorized key into the keyway 118 and rotating the key to the desired position, the details of which will be discussed in greater depth hereinafter.

Markers 122, 124 and 126 are disposed on the front of the lock 100 for visually assisting the user in locating these operation positions. Marker 122 marks the key position for locating the lock 100 in the locked position. Marker 124 marks the key position for locating the lock 100 in the ratcheting position. Finally, Marker 126 marks the key position for locating the lock 100 in the releasing position. With the various operation positions so marked, the operation of the lock 100 is greatly simplified since the user needs only to insert and rotate the authorized key to the marked location for performing the desired operation of the lock 100.

Figure 5:
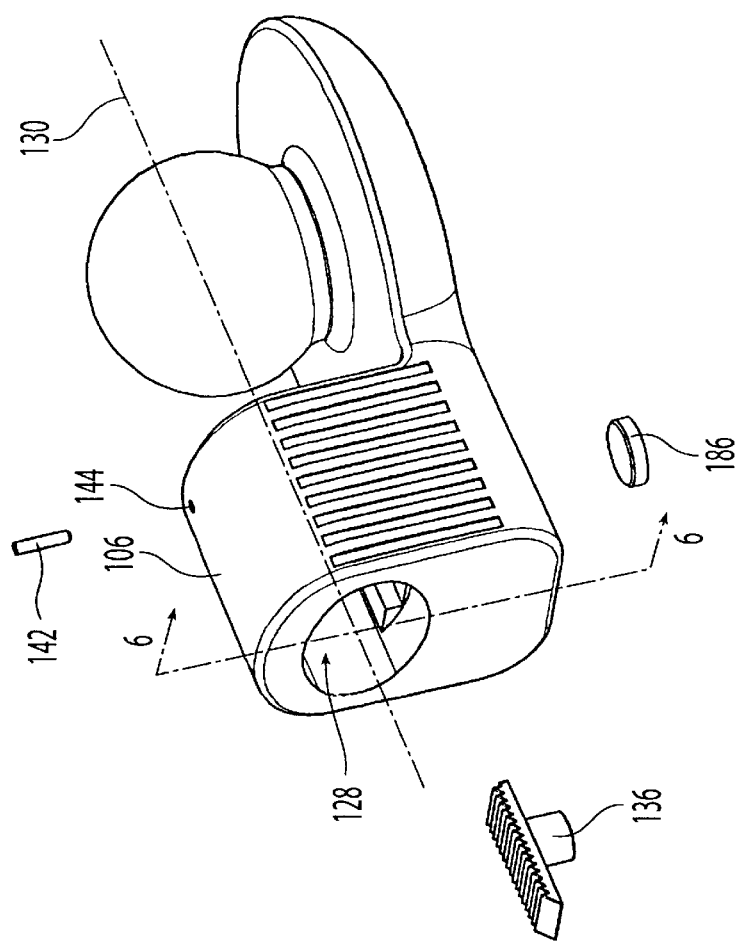
FIG. 5 is an exploded view of the lock construction in FIG. 1, showing the operating elements prior to assembly.
Figure 5:
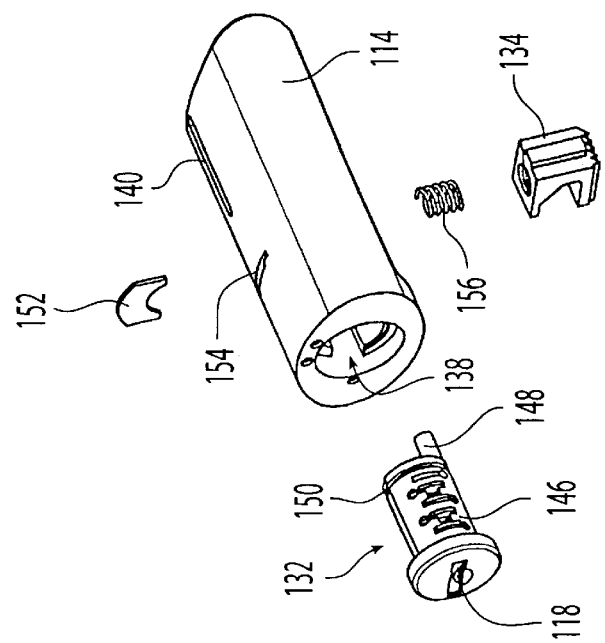

The operating elements of the lock 100 are shown unassembled in FIG. 5 and assembled in FIG. 6. The lock housing 106 defines an interior cavity 128 having a longitudinal axis 130 extending therethrough. The operating elements, including the shaft 114, a locking mechanism 132, a ratchet member 134, and a ratchet surface on a ratchet type plate 136, are received within the interior cavity 128 of the lock housing 106. The shaft 114 includes a shaft cavity 138 for receiving the lock mechanism 132 and the ratchet member 134. The shaft 114 further includes an elongated groove 140 for receiving a pin 142. The pin 142 is inserted through a pin recess 144 disposed on the housing 106 for securing the shaft 114 to the housing 106. When inserted, the pin 142 engages the elongated groove 140 on top of the shaft 114, limiting the sliding movement of the shaft 114 toward and away from the ball 104 as the pin 142 travels the length of the groove 140.

The locking mechanism 132 includes a lock cylinder 146, which is shown in FIG. 5 as a conventional wafer lock assembly having a plurality of wafers that are fitted for the authorized key. Other locking mechanisms, such as pin tumblers or electronic access mechanisms may also be used. A protrusion 148, in the shape of a finger, extends from the lock cylinder 146 for engaging the ratchet member 134. A groove 150 is disposed partially around the outer perimeter of the lock cylinder 146 proximal to the finger 148 for receiving a retaining clip 152. A slot 154 extends from the top surface of the shaft 114 to the shaft cavity 138 for mounting the retaining clip 152. The retaining clip 152 engages the groove 150 around the perimeter of the lock cylinder 146 for retaining the lock cylinder 146 within the shaft cavity 138 of the shaft 114 while allowing the lock cylinder 146 to rotate therein about the longitudinal axis 130.

Referring now to FIG. 6, the shaft 114 includes a ratchet opening 158 in the shaft cavity 138 that extends from the bottom surface of the shaft 114 toward a spring recess 160 on the upper surface of the shaft 114. The ratchet member 134 is disposed in the ratchet opening 158 of the shaft cavity 138 at a first axial location. A compression spring 156, is received in the spring recess 160 for resiliently and downwardly biasing the ratchet member 134 in a direction perpendicular to the longitudinal axis 130. Although a compression spring is shown in the preferred embodiment, other types of springs or biasing devices may also be used.

"The ratchet member 134 is generally U-shaped with a first or lower outer side 162 and a second or upper outer side 164. The lower and upper sides 162 and 164 form lower and upper legs 166 and 168, defining a recess 170 therebetween, as shown in FIG. 7. The ratchet member 134 has a toothed section 172 disposed on the first side 162, as shown in FIG. 8, for engaging a toothed section 174 of the ratchet surface 136, as shown in FIG. 9. The toothed section 172 of the ratchet member 134, however, may be in the form of a pawl for engaging the tooth section 174 of the ratchet surface 136. The spring 156 is operatively connected to the upper outer side 164 for biasing the ratchet member 134 downwardly toward the ratchet surface 136. Accordingly, the spring 156 biases the ratchet member 134 against the ratchet surface 136 forcing the toothed sections 172 and 174 of the ratchet member 134 and ratchet surface 136 into an intermeshing engagement with each other. The lock cylinder 146 is inserted in the shaft cavity 138 at a second axial location, adjacent to the first axial location of the ratchet opening 158, such that the finger 148 of the lock cylinder 146 is received within the recess 170 of the ratchet member 134."

The lock housing 106 includes a ratchet opening 176 extending from the base 102 to the interior cavity 128 of the lock housing 106. The ratchet surface 136 is inserted within the lock housing 106 with the base portion fitted within the ratchet opening 176. A plug 186 is used to secure the ratchet opening 176 from the exterior of the lock housing 106, preventing entry of dirt or other debris.

Figure 10:
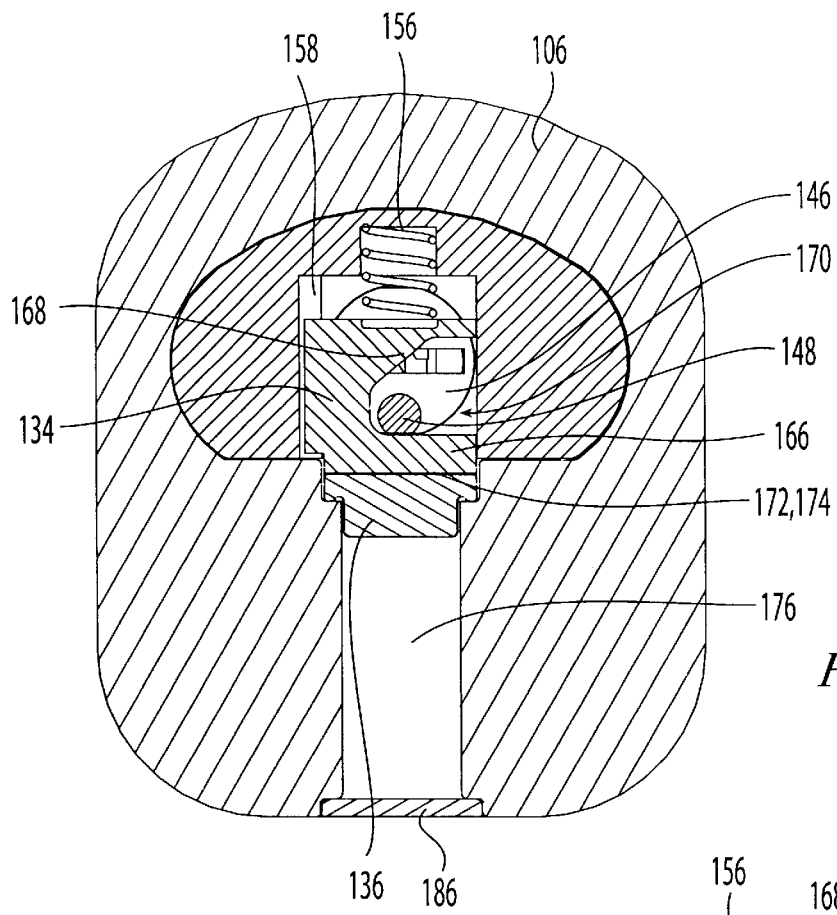
FIG. 10 is a cross-sectional view taken along line 10—10 of the lock construction of FIG. 6, showing the lock in a locked position.
Figure 11:
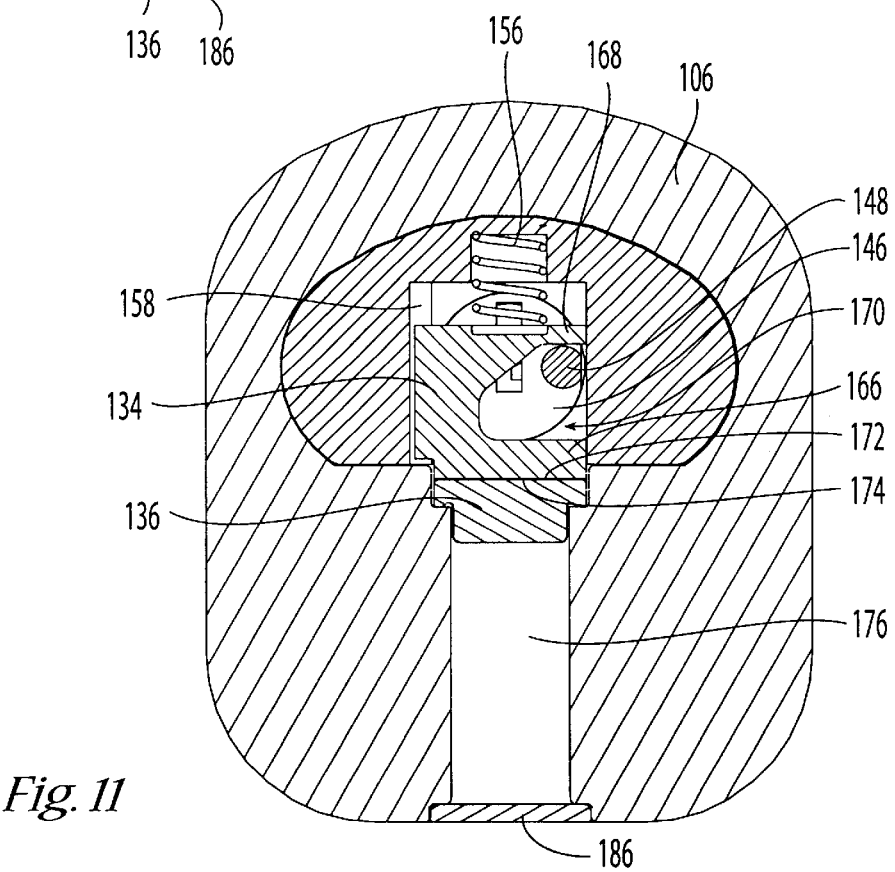
FIG. 11 is a cross-sectional view taken along line 11—11 of the lock construction of FIG. 6, showing the lock in a ratcheting position.
Figure 12:
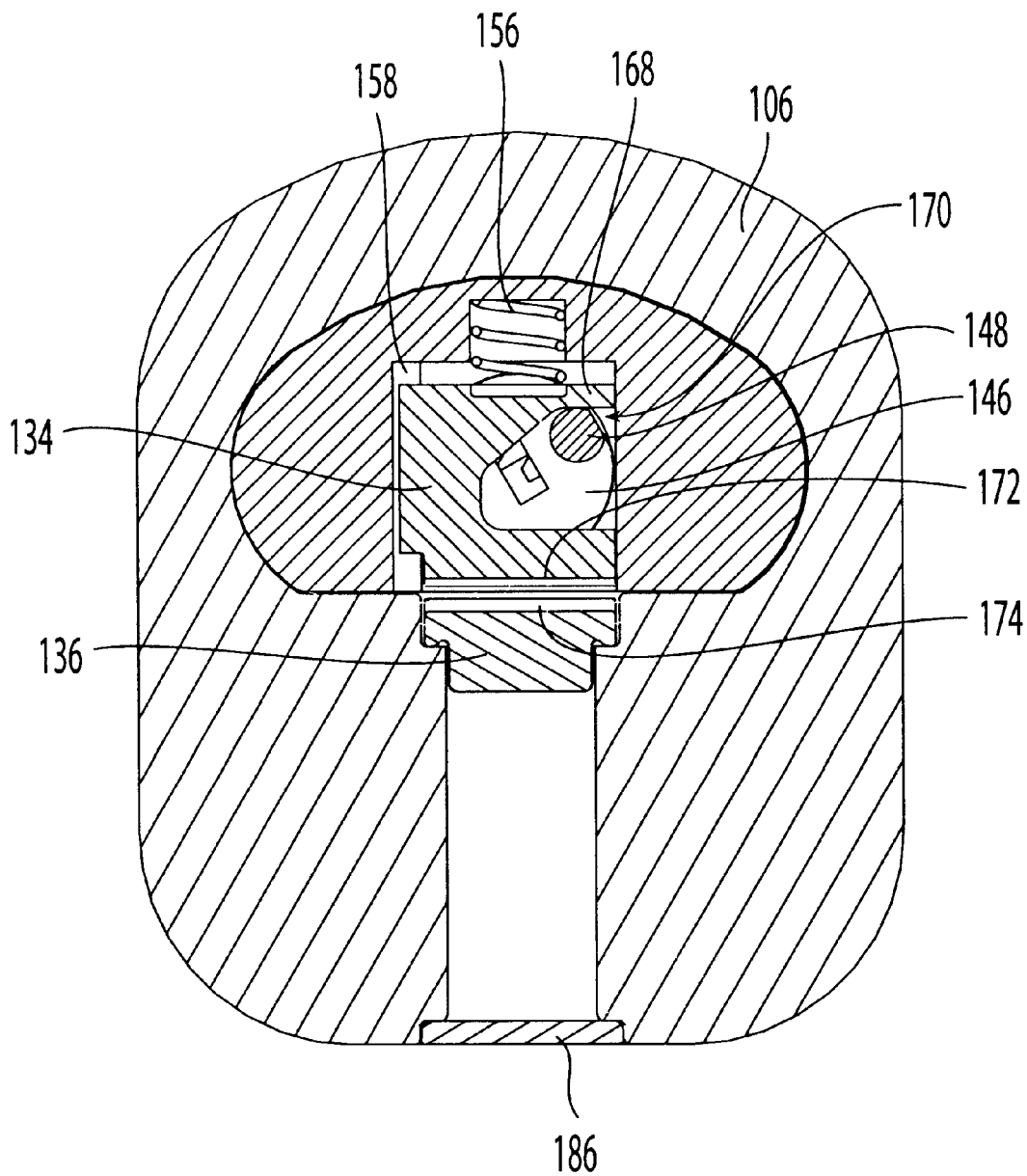
FIG. 12 is a cross-sectional view taken along line 12—12 of the lock construction of FIG. 6, showing the lock in an unlocked position.

FIGS. 10–12 show the details of the operation of the lock 100. As stated previously, the lock 100 has three operating positions and these positions are located by rotating the lock cylinder 146 of the locking mechanism 132 with an authorized key to the designated location. FIG. 10 shows the lock 100 in the locked position with the locking mechanism 132 in a first engagement position with the ratchet member 134. In the first engagement position, the finger 148 of the lock cylinder 146 is received within the ratchet recess 170 in abutting engagement with the inside surface of the lower leg 166 of the ratchet member 134. The finger 148 thereby displaces the ratchet member 134 against the ratchet surface 136, pressing the toothed sections 172 and 174 of the ratchet member 134 and ratchet surface 136 into an intermeshing engagement. Accordingly, the shaft 114 is prevented from movement in either direction toward or away from the ball 104. In use, the trailer socket 112 is fitted over the ball 104, and the shaft 114 is moved to the locked position engaging the exterior of the socket 112. With the lock cylinder 146 in the locked position, preventing the shaft 114 from movement, the socket 112 is securely held between the ball 104 and the shaft 114.

In the ratcheting position shown in FIG. 11, the locking mechanism 132 is in a second engaging position with the ratchet member 134. In the second engaging position, the finger 148 of the lock cylinder 146 is rotated such that it is between the two legs 166 and 168 of the ratchet member 134 without vertically displacing the ratchet member 134. Accordingly, the ratchet member 134 is pressed into engagement with the ratchet surface 136 solely by the force of the spring 156. The ratcheting position is maintained as long as the finger 148 of the lock cylinder 146 is received in the recess 170 and does not displace the ratchet member 134 in either direction perpendicular to the longitudinal axis 130.

In the ratcheting position, the configuration of the toothed sections 172 and 174 of the engaging ratchet member 134 and ratchet surface 136 allows movement of the shaft 114 in only one direction toward the ball 104 when the force applied in that direction overcomes the downward force of the spring 156. For this purpose, each tooth of the tooth sections 172 and 174 has one angled or sloped side 178 and 180 and one straight side 182 and 184, respectively, as shown in FIGS. 8 and 9. The toothed sections 172 and 174 of the rachet member 134 and ratchet surface 136 are configured such that a lateral force applied by the user to the shaft 114 in the direction toward the ball 104 will cause the ratchet member 134 to glide over the angled surface 184 of the toothed section 174 of the ratchet surface 136 against the downward force of the spring 156. Lateral movement of the shaft 114 away from the ball 104 is prevented, however, due to the non-sloping surfaces 182 and 184.

"The angle of the sloped surfaces 178 and 180 is selected to assist the user in pushing shaft 114 toward ball 104, while preventing movement in the opposite direction. The angle of the sloped surfaces 178 and 180 as shown is 45°. However, other angles may be used with consideration to the compression force of the spring 156 to ensure proper operation of the lock 100 in the ratcheting position. Once in the ratcheting position, the lock 100 can be moved from the fully open and unlocked position, where the shaft 114 is disposed axially away from the ball 104, toward the locked and closed position, where the shaft 114 is in abutting engagement with the socket 112 fitted over the ball 104. By moving the shaft 114 toward the ball 104 along the ratchet teeth surfaces 178 and 180, the shaft 114 is moved as necessary to properly tighten the socket 112 over the ball 104 or to accommodate different socket sizes."

In the releasing position of the shaft 114, as shown in FIG. 12, the finger 148 of the lock cylinder 146 is pressed into engagement with t he upper leg 168 of the ratchet member 134, displacing the ratchet member 134 against t he spring 156 and disengaging the toothed sections 172 of the ratchet member 134 from the toothed section 174 of the ratchet surface 136. In this position, the shaft 114 is completely free to move in either direction between the locked and unlocked positions toward and away from the ball 104. Movement away from the ball 104 i s effected by pulling o n the key. Movement toward the ball 104 is effected by pushing on the shaft 114 near the outer end of the lock cylinder 146.

Preferably, the compression force of the spring 156 biases the cylinder 146 towards the ratcheting position such that to effect the releasing position, the user rotates the cylinder 146 to and manually maintain the cylinder 146 at the releasing position. Accordingly, when the lock 100 is in the unlocked position, the lock 100 defaults to the ratcheting position, allowing greater ease in the operation of the lock 100.

An illustrative operation of the lock 100 will now be described with respect to the preferred embodiment. To secure the lock 100 to the trailer, a user inserts an authorized key within the keyway 118 of the lock cylinder 146 and rotates the cylinder to the releasing position, marker 126, as shown in FIG. 4. In the unlocked position, the shaft 114 is freely moveable to and away from the ball 104, allowing greater ease in inserting the ball 104 within the socket 112, as shown in FIG. 2.

Once the socket 112 is inserted over the ball 104 of the lock 100 and wit h the lock 100 in the releasing position, the user further secures the lock 100 by keeping the lock 100 in the releasing position a and pushing the shaft 114 toward the sock et 112 until the tip 116 of the shaft 114 abuts the exterior surface of the socket 112. The user thereafter releases the lock, allowing the lock to default to the ratcheting position, marker 124, such that the space between the ball 104 and the shaft 114 can be easily adjusted and tightened, depending on the particular construction and size of the trailer socket. Once the shaft 114 is tightened against the socket 112, the user rotates the key to the locked position, marker 122, to prevent any movement of the shaft 114. Once in the locked position, the socket 112 is securely locked between the shaft 114 and the ball 104.

Figure 13:
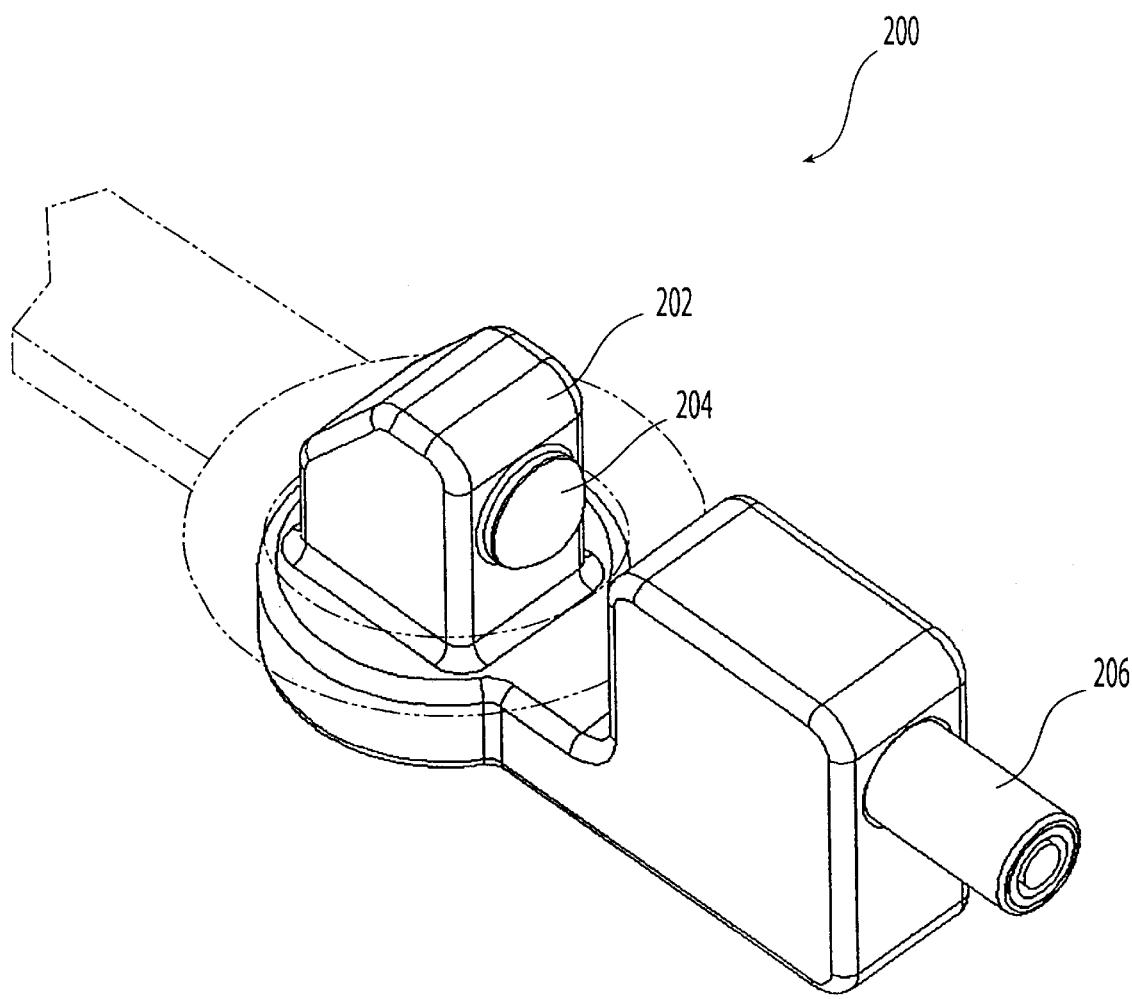
FIG. 13 is a perspective view of another embodiment of a lock construction according to the present invention.

Another embodiment of a lock 200 according to the present invention is shown in FIG. 13. The locking mechanism and operation thereof are similar to the lock 100 of the previous embodiment. In place of the spherical ball 104 of the previous embodiment, a vertical block member 202 is used for insertion into the socket of the trailer. The block member 202 provides a different attachment structure for trailers having different connection mechanisms. For example, in addition to a trailer with a socket, such as shown at 112 in FIGS. 2 and 3, a trailer having a eyelet type connection may easily fit over the block member 202 for attachment thereto. The eyelet connection is shown in phantom in FIG. 13.

The lock 200 additionally includes an abutment 204 that extends from the vertical block member 202. With respect to a trailer with the socket 112 of FIGS. 2 and 3, the abutment 204 engages the inner surface of the socket to allow secure engagement therewith. The abutment 204 is additionally adaptable for use with the eyelet type socket by securing the eyelet between the abutment and the base of the lock 200. In this situation, the shaft 206 will be moved to a locked position engaging the abutment or close enough thereto to prevent removal of the eyelet.

It will be appreciated that those skilled in the art may devise numerous modifications and embodiments within the scope of the present invention. It is intended that the following claims cover all such modifications and embodiments.

We claim:

1. A lock construction, comprising:

a) a base;

b) a first upstanding member extending from said base;

c) a second upstanding member extending from said base in spaced relation to said first upstanding member;

d) a ratchet surface connected to said second upstanding member;

e) a third member slidably positioned within said second upstanding member for movement from a locked location for securing an object between said first and third members to an unlocked location spaced from said first upstanding member for releasing the object secured therebetween; and f) a locking mechanism disposed within said third member and having a ratchet member engageable with said ratchet surface of said second upstanding member to permit movement of the third member toward said first upstanding member and to different locked locations relative to said first upstanding member.

2. The lock construction of claim 1, wherein said third member is a shaft like member; said shaft like member having a shaft cavity and said locking mechanism is disposed in said shaft cavity.

3. The lock construction of claim 2, further comprising a spring disposed in said shaft cavity for resiliently biasing said ratchet member into engagement with said rachet surface.

4. The lock construction of claim 3, wherein said ratchet member includes a toothed section and said ratchet surface includes a toothed section for engaging said toothed section of said ratchet member.

5. The lock construction of claim 4, wherein said locking mechanism further comprises a protrusion extending from said locking mechanism and movable therewith for displacing said ratchet member.

6. A lock construction as in claim 5, wherein said ratchet member comprises first and second legs defining a recess therebetween for receiving said protrusion of said locking mechanism such that:

a) said protrusion is movable to an abutting engagement with said first leg of said ratchet member and thereby displacing said ratchet member against said ratchet surface, preventing movement of said shaft like member;

b) said protrusion is movable within said recess between said first and second legs of said ratchet member such that said ratchet member is biased by said spring against said ratchet surface, allowing slidable movement of said shaft like member toward said first upstanding member at said different locked locations; and c) said protrusion is movable against said second leg of said ratchet member and thereby displacing said ratchet member away from said ratchet surface, allowing slidable movement of said shaft like member between said unlocked and locked locations.

7. A lock construction for locking a trailer socket member against attachment to a connecting member of a vehicle hitch, said trailer socket member having an interior socket wall and an exterior socket wall, said lock comprising:

a) a base;

b) a first upstanding member extending from said base for movement into said trailer socket member and into engagement with the interior wall thereof;

c) a second upstanding member extending from said base in spaced relation to said first upstanding member;

d) a ratchet surface connected to said second upstanding member;

e) a third member slidably positioned within said second upstanding member for movement from an unlocked location spaced from said first upstanding member and a locked location in engagement with the exterior of said trailer socket member to hold the socket member between said first upstanding member and third member; and f) a locking mechanism disposed within said third member and moveable between a first position to release said third member for movement to said unlocked location and a second position to permit movement of said third member to said locked location; said locking mechanism including a ratchet member engaging with the ratchet surface of said second upstanding member to permit movement of said third member toward said first upstanding member and to different locked locations relative to said first upstanding member so as to accommodate different sizes of trailer socket members.

8. The lock construction of claim 7, wherein said first upstanding member has an outer configuration and said interior socket wall has an inner configuration such that the outer configuration of said first upstanding member substantially corresponds to the inner configuration of said interior socket wall.

9. The lock construction of claim 8, wherein said outer configuration of said first upstanding member has a ball shape for holding a concave type socket member having a ball shape inner configuration.

10. The lock construction of claim 7, wherein said first upstanding member further comprises an abutment for engaging said third member.

11. The lock construction of claim 10, wherein said socket member is an eyelet type socket member and said eyelet of said socket member is fitted over said first upstanding member such that the socket member is held between said base and abutment when said third member is in said locked location.

12. The lock construction of claim 7, wherein said ratchet surface and ratchet member have cooperating parts biased into engagement with each other.

13. The lock construction of claim 12, wherein said locking mechanism is rotatable to:

a) first engaging position with said ratchet member, displacing said ratchet member against said ratchet surface to prevent movement of said third member in said locked location with the socket engaged between said first upstanding member and said third member;

b) a second engaging position with said ratchet member such that said ratchet member is biased by a spring against said ratchet surface, allowing slidable movement of said third member in said unlocked position toward said first upstanding member and at said different locked locations relative to said first upstanding member for accommodating different sizes of trailer socket members; and c) a third engaging position with said ratchet member, displacing said ratchet member away from said ratchet surface to allow slidable movement of said third member between said unlocked and locked locations to release said socket member engaged therebetween.

* * * * *